UNITED STATES PATENT OFFICE.

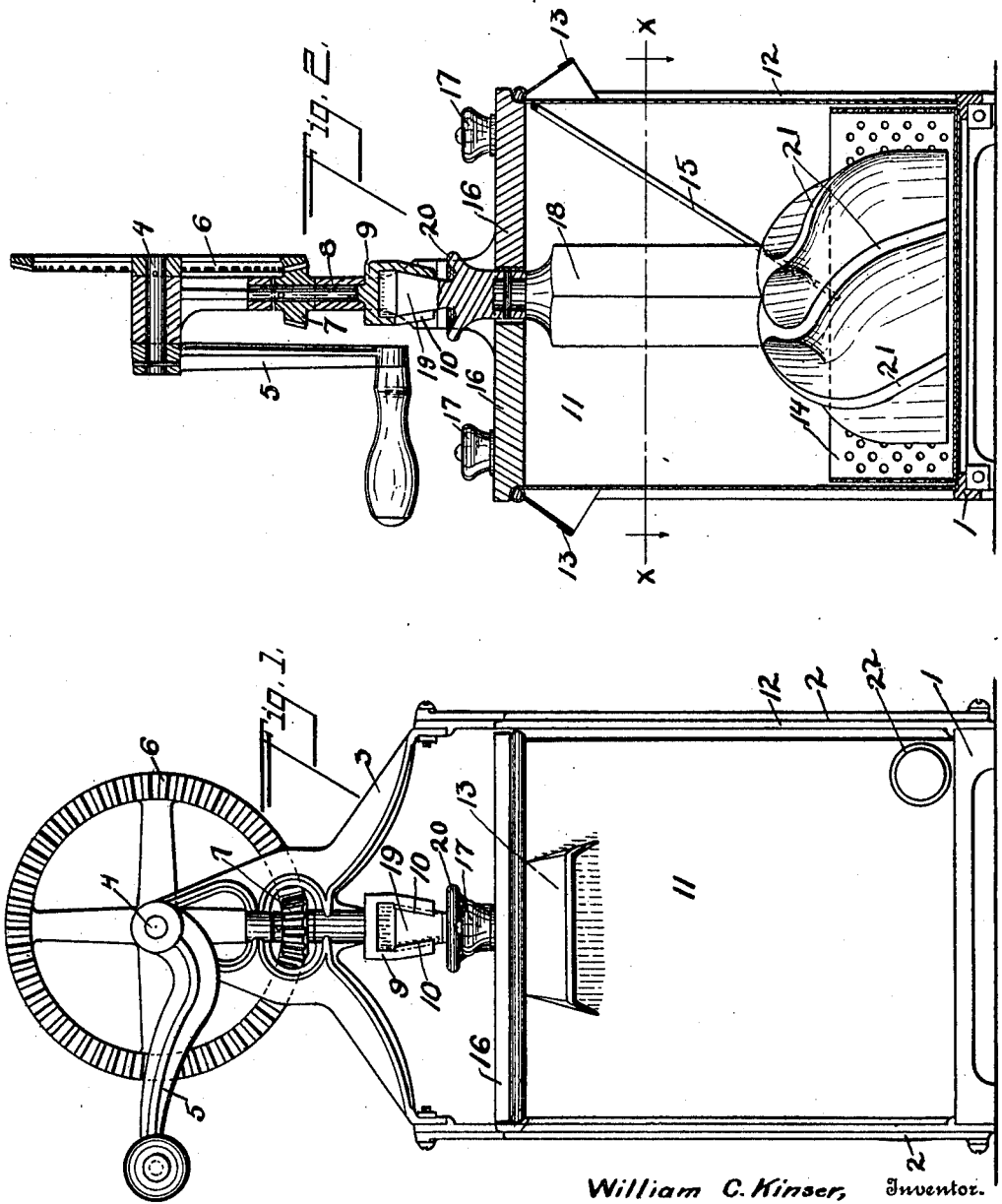

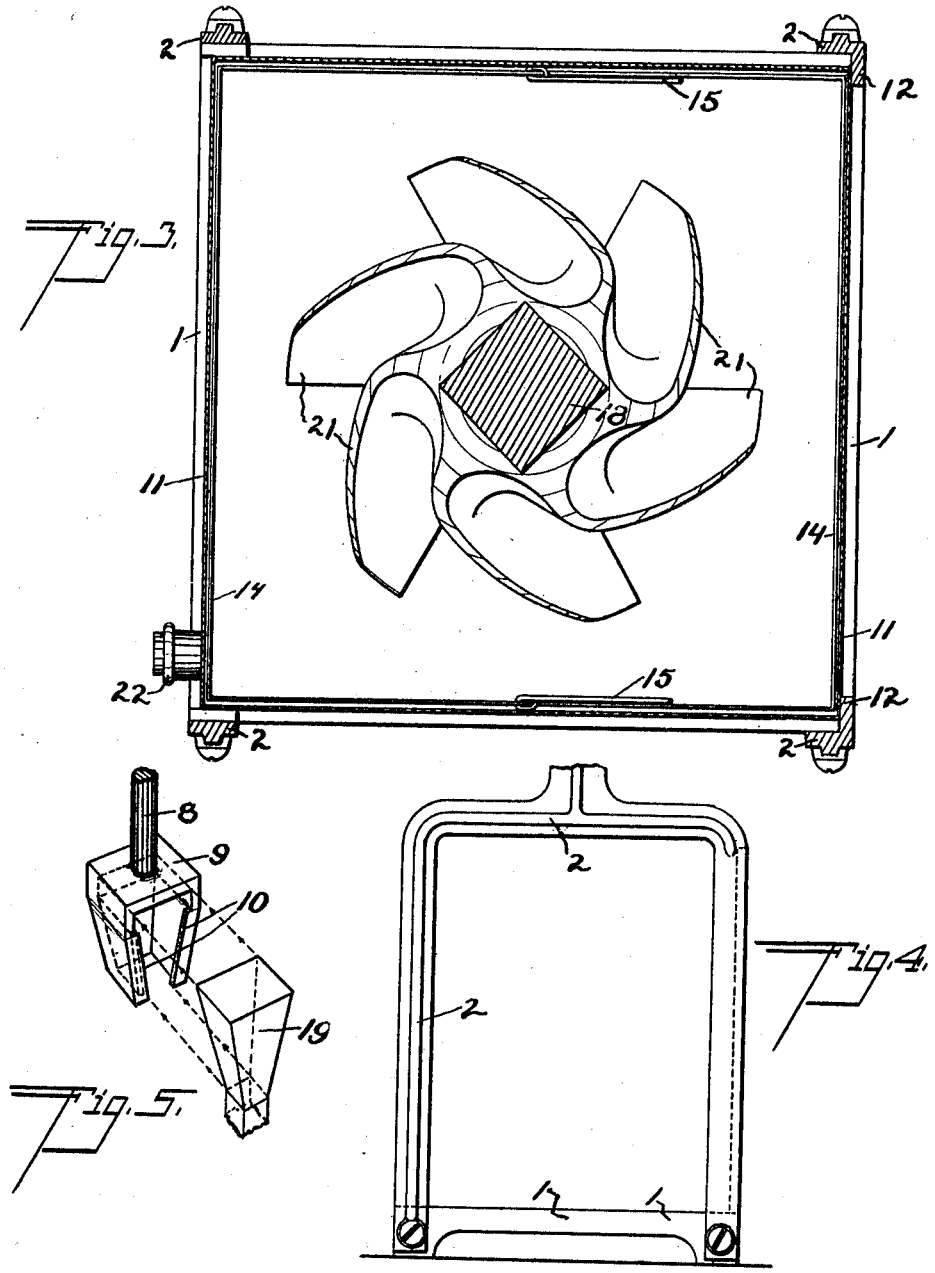

WILLIAM C. KINSER, OF OMAHA, NEBRASKA.

CHURN.

970,061.  Specification of Letters Patent.  Patented Sept. 13, 1910.

Application filed June 1, 1909. Serial No. 499,608.

*To all whom it may concern:*

Be it known that I, WILLIAM C. KINSER, a citizen of the United States, and a resident of Omaha, in the county of Douglas and State of Nebraska, have invented certain new and useful Improvements in Churns, of which the following is a specification.

My invention relates to devices for agitating, beating, stirring or whipping liquid or semi-fluid materials, and especially to such devices as adapted for household use with milk, cream, eggs and the like, as in making butter, whipping cream, beating eggs, etc.

It is the object of my invention to provide a simple, inexpensive, efficient, durable and easily cleanable device for the purposes above, and by which the materials may be rapidly and effectively agitated, beaten and mixed with air.

My invention relates more particularly to the specific form of the dasher or agitating member, the means for connecting said member with and suspending the same from the actuating shaft, and certain other combinations and arrangements as will be more fully pointed out hereinafter.

Constructions embodying my invention are illustrated in the accompanying drawings, in which—

Figure 1 is a front elevation of the device, Fig. 2 is a transverse section thereof, Fig. 3 is a horizontal sectional view thereof on the plane of the line *x—x* of Fig. 2, Fig. 5 is a perspective detail of the coupling for connecting the agitating member and actuating shaft, and Fig. 4 is a side elevation of the base and side frame.

In the construction of the device I provide a suitable base 1, to the sides of which are secured the upright rectangular side-frames 2. To the upper parts of the side-frames are connected the foot-portions of the transverse upper frame 3. At the upper extremity of the frame 3 is journaled a horizontal shaft 4 which carries at one end a crank handle 5 and at the opposite end a bevel gear 6. The said gear 6 meshes with a bevel pinion 7 carried by a vertically extending shaft 8 which is journaled in the frame 3 at the lower central portion thereof. At the lower end of the shaft 8 and integral therewith is the coupling socket member 9 which is formed with a pyramidal cavity therein and has an opening in the side thereof extending into the said cavity, the said opening being narrower at the bottom than at the top thereof, and there being inwardly extending flanges 10 at the sides thereof, as shown in Fig. 5.

A rectangular receptacle 11, preferably made of sheet metal, is placed on the base 1 between the side-frames 2. The base is formed with a shallow recess in which the receptacle sits, and at the rearward sides of the side-frames 2 are flanges 12 which engage the rearward side of the receptacle. The receptacle is provided with handles 13 and may be removed from the frame by lifting the same out of the recessed base and then forwardly from between the side-frames 2. Within the receptacle is disposed a tray or basket 14, constructed of sheet metal and having perforated sides and imperforate bottom. The said basket 14 is provided with a wire bail 15 of rectangular outline and of a length such that when the basket is set on the bottom of the receptacle the bail may extend diagonally upward therefrom and rest against the side of the receptacle just below the cover 16, as shown in Fig. 2. The cover 16 is made in two parts each of which is provided with a lifting-knob 17 and at the edges is shouldered so as to fit over the upper edge of the receptacle. At the center of the cover is a circular opening for the shaft 18 of the dasher or agitating member. At the upper end of the dasher-shaft is a head 19 of the form of an inverted truncated pyramid, the said head being adapted to be passed through the opening in the side of the coupling socket 9 into the pyramidal cavity therein and then dropped down behind the flanges 10 so as to be retained in the cavity and held in axial alinement with the actuating shaft 8. The construction of the coupling and the manner of engaging and disengaging the head and socket will be apparent by reference to Fig. 5. Below the head 19 a cup 20 is arranged so as to catch any oil or grease that might run down from the bearings of the shafts 4 and 8, and prevent the possibility of the same getting into the contents of the receptacle.

The dasher is carried at the lower end of the shaft 18 and comprises a series of inclined blades 21 formed integrally with said shaft. The lower edges of the blades are substantially radial to the shaft and are arranged to just clear the bottom of the receptacle. From the outer lower corners of the blades the edges thereof extend upwardly and then curve inwardly so that the outline of the dasher is that of a semisphere superposed upon a short cylindrical base. The incline of the blades to the axis of the shaft is substantially uniform from the lower edges thereof to a point somewhat more than half of their height, after which they curve sharply upward so that at the extreme upper ends thereof they have no inclination to the axis of rotation.

In the use of the device, the material to be operated upon is placed within the receptacle and the crank handle turned to actuate the dasher in either direction. If the direction of movement of the dasher is the same as the upward inclination of the blades, the material engaged thereby will be thrown downward by the inclination thereof and outward by the centrifugal action thereof. The materials, being so actuated, are thereby forced upwardly at the sides of the receptacle and thence falling inwardly are again caught by the dasher and the movement continued. A considerable amount of air is sucked down into the vortex formed by the dasher and becomes mixed with the material so that the same is rapidly aerated. If the direction of rotation is opposite to the upward inclination of the blades the material engaged thereby is first thrown upward by the inclination thereof and then thrown outward by the centrifugal action of the upper non-inclined parts thereof, whence, striking the sides of the receptacle it descends and continues the cycle of movement. This action also causes a rapid aeration of the material. The rectangular form of the receptacle prevents the material from attaining a circular movement therein such as would be attained in a cylindrical vessel.

In the use of the device as a churn for butter, after the butter has formed therein, the milk may be drawn off through the spout 22 at the front of the receptacle, after which water may be poured therein and the butter washed by further agitation. The dasher may then be disconnected at the coupling 9, removed from the receptacle, the latter removed from the frame, and the butter lifted out of the receptacle by means of the perforated tray or basket 14 and finally washed by running water over the same while contained in the basket.

Now, having described my invention, what I claim and desire to secure by Letters Patent is:

In a device of the class described, a rectangular receptacle, a dasher suspended within said receptacle, and actuating means for rotating said dasher upon a vertical axis, the outline of the dasher being that of a semisphere superposed upon a short cylindrical base, and the dasher being formed by a series of blades of which the lower edges extend substantially radially to the axis of rotation, the lower parts of the blades having a considerable inclination to the axis of rotation and the upper parts of the blades curving upwardly so that the upper extremities thereof have no inclination to the axis of rotation.

In testimony whereof I have hereunto subscribed my name in the presence of two witnesses.

WILLIAM C. KINSER.

Witnesses:
Roy G. Kratz,
D. O. Barnell.